(12) United States Patent
Baccarin Arnaut

(10) Patent No.: US 10,748,101 B2
(45) Date of Patent: Aug. 18, 2020

(54) ONTOLOGY FOR DEVELOPMENT-TIME SOA SERVICE REPOSITORY HAVING SERVICES IMPLEMENTED USING VARYING TECHNOLOGIES

(71) Applicant: INTERNATIONAL BUSINESS MACHINES CORPORATION, Armonk, NY (US)

(72) Inventor: Wagner L. Baccarin Arnaut, Brasilia (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 471 days.

(21) Appl. No.: 15/175,080

(22) Filed: Jun. 7, 2016

(65) Prior Publication Data

US 2017/0351983 A1    Dec. 7, 2017

(51) Int. Cl.
*G06Q 10/06* (2012.01)
*G06F 8/20* (2018.01)
(Continued)

(52) U.S. Cl.
CPC .......... *G06Q 10/0637* (2013.01); *G06F 8/10* (2013.01); *G06F 8/20* (2013.01); *G06F 8/36* (2013.01);
(Continued)

(58) Field of Classification Search
None
See application file for complete search history.

(56) References Cited

U.S. PATENT DOCUMENTS 8,024,397 B1    9/2011  Erickson et al.
8,566,358 B2   10/2013  Lane et al.
(Continued)

OTHER PUBLICATIONS

Arnaut, "OWL-SOA: A Service Oriented Architecture Ontology Useful During Development Time And Independent From Implementation Technology," IEEE 2010, Research Challenges in Information Science (RCIS), 2010 Fourth International Conference, pp. 523-532.*

(Continued)

*Primary Examiner* — Ivan R Goldberg
(74) *Attorney, Agent, or Firm* — Michael O'Keefe; Matthew M. Hulihan; Heslin Rothernberg Farley & Mesiti PC

(57) ABSTRACT

Providing an ontology for a service-oriented architecture deployment in a computing environment, the ontology providing organization and identification of services in a development-time service repository of the service-oriented architecture. The services in the development-time service repository are implemented using varying service implementation technologies and the ontology supports inquiries about services implemented using the varying service implementation technologies. The providing the ontology includes linking to Reusable Asset Specification artifacts associated with the services in the development-time service repository, the linking using an Open Services for Lifecycle Collaboration (OSLC) specification. Based on submission of a request to identify service results from the development-time service repository, identifying, using the ontology, one or more services of the services in the development-time service repository, and responding to the request with an indication of the one or more services.

15 Claims, 8 Drawing Sheets

(51) Int. Cl.
*G06F 16/36* (2019.01)
*G06F 8/10* (2018.01)
*G06F 8/36* (2018.01)

(52) U.S. Cl.
CPC ....... *G06F 16/367* (2019.01); *G06Q 10/0633* (2013.01)

(56) References Cited

U.S. PATENT DOCUMENTS

| | | | |
|---|---|---|---|
| 8,595,246 B2 | 11/2013 | Fay et al. | |
| 8,775,462 B2 | 7/2014 | Coldicott et al. | |
| 9,111,004 B2 | 8/2015 | Carrato et al. | |
| 2007/0156764 A1* | 7/2007 | O'Connell | G06F 8/36 707/999.2 |
| 2008/0065750 A1* | 3/2008 | O'Connell | H04L 41/12 709/223 |
| 2009/0049040 A1* | 2/2009 | Fay | G06F 17/30734 707/999.005 |
| 2012/0124547 A1* | 5/2012 | Halbedel | G06F 16/903 717/100 |
| 2016/0149825 A1* | 5/2016 | Darji | G06F 9/546 709/226 |

OTHER PUBLICATIONS

Bossa, "Towards Facilities to Introduce Solutions for MDE in Development Environments with Reusable Assets," 2014, 2014 IEEE 15th International Conference on Information Reuse and Integration (IRI), pp. 195-202.*
Hill, "Run-time monitoring of system performance: A goal-oriented and system architecture simulation approach," In First International Workshop on Requirements@ RunTime (RE@ RunTime), pp. 31-40, IEEE, 2010 (Year: 2010).*
Duda, Test-Driven Service Discovery in Mobile Environments, 2009 International Conference on Parallel Processing Workshops, IEEE, pp. 1-6 (Year: 2009).*
Park, "Extending Reusable Asset Specification to Improve Software Reuse," 2007, Proceedings of the 2007 ACM Symposium on Applied Computing, pp. 1473-1478, ACM (Year: 2007).*
Aichernig, "Integration of Requirements Engineering and Test-Case Generation via OSLC," 2014, 14th International Conference on Quality Software, IEEE, pp. 117-126 (Year: 2014).*
Zhang, "Modeling of Tool Integration Resources with OSLC Support," 2014, 2nd International Conference on Model-Driven Engineering and Software Development, IEEE, pp. 99-110 (Year: 2014).*
Object Management Group, Documents Associated With Reusable Asset (RAS) Version 2.2, http://www.omg.org/spec/RAS/2.2/.
W3C Member Submission, OWL-S: Semantic Markup for Web Services, Submitted Nov. 22, 2004, http://www.w3.org/Submission/OWL-S/.
Oasis, PASIS UDDI Specifications TC—Committee Specifications, https://www.oasis-open.org/committees/uddi-spec/doc/tcspecs.htm.

W3C Member Submission, Web Service Semantics—WSDL-S, Submitted Nov. 7, 2005, http://www.w3.org/Submission/WSDL-S/.
Arnaut et al., "OWL-SOA: A Service Oriented Architecture Ontology Useful During Development Time And Independent From Implementation Technology", IEEE 2010, 10 pages.
Web Service Modeling Ontology, http://www.wsmo.org/head01.htm.
Kamada et al., "Business Rules in a Service Development and Execution Environment", IEEE 2007, pp. 1366-1371.
Swiatek et al., Service Composition in Knowledge-based SOA Systems, New Generation Computing, 2012, pp. 165-188.
Racer, developed by Prof. Dr. rer. nat. habil. Volker Haarslev et al., Universitat Zu Lubeck, last amended Mar. 22, 2016, http://www.sts.tu-harburg.de/~r.f.moeller/racer/.
Asunción Gómez-Pérez et al., "Ontological Engineering", Universidad Politécnica de Madrid, 109 pages.
Biplav Srivastava et al., "Enhancing Asset Search and Retrieval in a Services Repository using consumption Contexts", 2007 IEEE International Conference on Services Computing, pp. 1-8.
Claus Pahl, "Semantic model-driven architecting of service-based software systems", Dublin City University, School of Computing, Dublin 9, Ireland, Nov. 7, 2006, pp. 838-850.
John Gilman, "Dynamic Service Discovery and Mediation in the Insurance Industry", Webify Solutions, Inc., pp. 1705-1706.
Asit Dan et al., "SOA Service Reuse by Design", 2nd International Workshop on Systems Development in SOA Environments. SDSOA2008, 2008, pp. 25-28.
Ruben Lara et al., "A Conceptual Comparison between WSMO and OWL-S", 2004, pp. 1-27.
Devis Bianchini et al., "Ontology-based methodology for e-service discovery", Information Systems, Jun. 2006, pp. 361-380.
Ziyang Duan et al., "SOA Without Web Services: a Pragmatic Implementation of SOA for Financial Transactions Systems", 2005 IEEE International Conference on Services Computing, 8 pages.
Alan Brown et al., "Using Service-Oriented Architecture and Component-Based Development to Build Web Service Applications", 2002 Rational Software Corporation, 16 pages.
Manoj Paul et al., "An Approach for Service Oriented Discovery and Retrieval of Spatial Data", Indian Institute of Technology, Kharagpur, pp. 88-94.
Mike P. Papazoglou, "Service-Oriented Computing: Concepts, Characteristics and Directions", Tilburg University, 10 pages.
Claus Pahl, "Ontology-based Description and Reasoning for Component-based Development on the Web", Dublin City University, School of Computing, SAVCBS'03 ESEC/FSE'03 Workshop, Sep. 12, 2003, pp. 1-4.
Jan Top et al., "Onto-SOA: From Ontology-enabled SOA to Service-enabled Ontologies", Conference Paper Mar. 2006, pp. 1-6.
Armin Haller et al., "WSMX—A Semantic Service-Oriented Architecture", Digital Enterprise Research Institute (DERI), pp. 1-8.
Ricardo de Almeida Falbo et al., "Using Ontologies to Add Semantics to a Software Engineering Environment", CEP 29060-900, 6 pages.

* cited by examiner

ONTOLOGY FOR DEVELOPMENT-TIME SOA SERVICE REPOSITORY HAVING SERVICES IMPLEMENTED USING VARYING TECHNOLOGIES

BACKGROUND

Service-oriented architecture (SOA) deployments have been one of the key initiatives in many organizations to provide the agility necessary for information technology departments to support business process changes. A challenge during SOA deployment is to create and deploy a service repository enabling proper identification of services in the repository. Ontologies have been utilized in some approaches, however existing solutions do not provide a broad enough applicability for all applications.

SUMMARY

Shortcomings of the prior art are overcome and additional advantages are provided through the provision of a computer-implemented method. The method includes providing an ontology for a service-oriented architecture deployment in a computing environment. The ontology provides organization and identification of a plurality of services in a development-time service repository of the service-oriented architecture. The plurality of services in the development-time service repository are implemented using varying service implementation technologies and the ontology supports inquiries about services implemented using the varying service implementation technologies. The providing the ontology includes linking to Reusable Asset Specification (RAS) artifacts associated with the plurality of services in the development-time service repository, the linking using an Open Services for Lifecycle Collaboration (OSLC) specification. Additionally, the method includes, based on submission of a request to identify service results from the development-time service repository, identifying, using the ontology, one or more services of the plurality of services in the development-time service repository, and responding to the request with an indication of the one or more services.

A computer program product and a computer system are provided that incorporate aspects of the above-recited method. Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
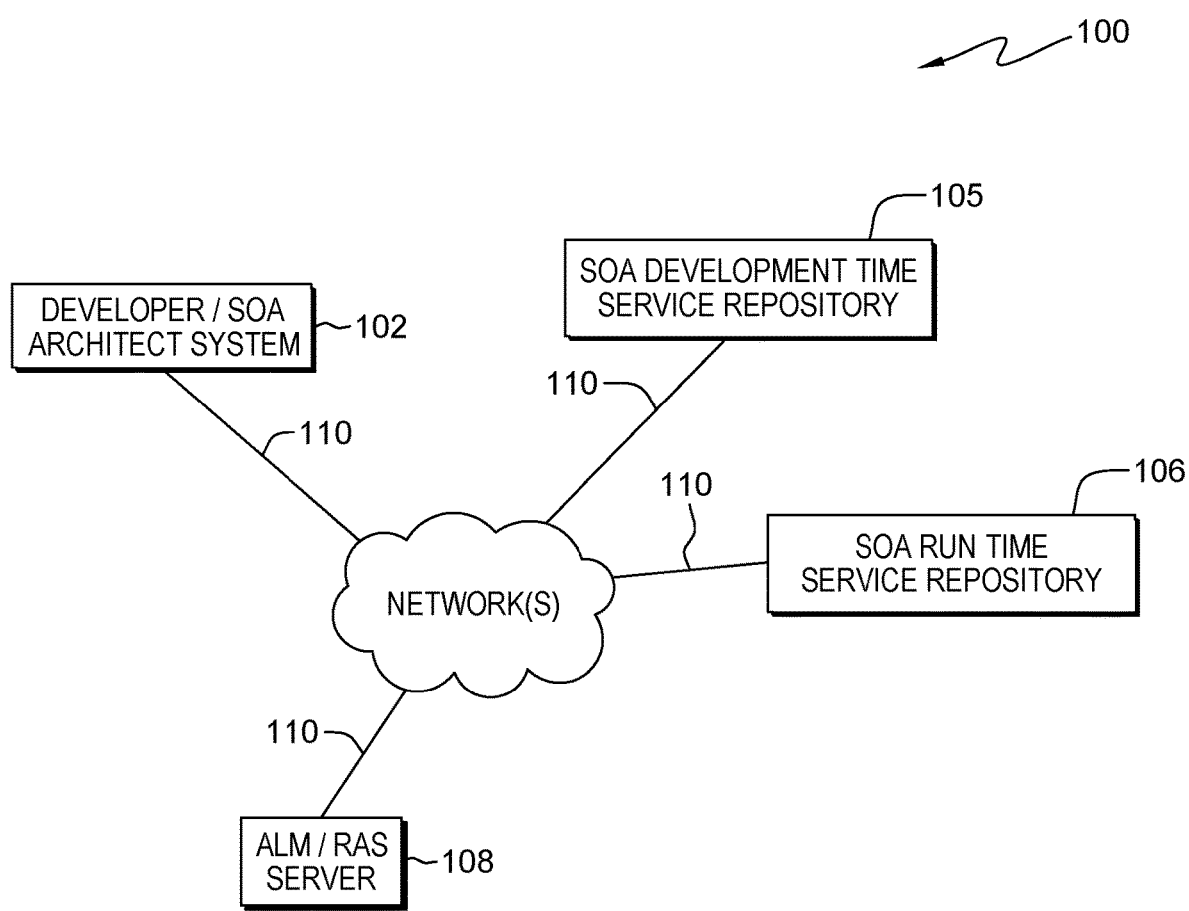
FIG. 1 depicts an example computing environment to incorporate and use aspects described herein.

Described herein are facilities providing an ontology for a service-oriented architecture deployment. The ontology provides organization and identification of services in service repositories, such as development-time service repositories. Additionally, the ontology supports services implemented using various types of service implementation technologies, as many organizations are starting to implement services using other service implementation technologies (not only Web Services), such as restful technologies (Representational State Transfer—REST).

Planning an SOA deployment includes defining a governance strategy for the SOA. This includes defining a service repository/catalog. Proper SOA catalog definition is regarded as being a key task to avoid an uncontrolled proliferation of services inside the organization in which case the organization may not realize the full benefit of service reuse in the SOA. SOA repositories can be of various types. Two such types are development-time repositories and runtime repositories.

Search and retrieval of services in SOA repositories may be best handled through use of an ontology. However, existing approaches do not provide for organizing/identifying services of a SOA development-time repository. Additionally, existing approaches are not independent of the service implementation technology used to implement the services, for instance they support only web services implemented using web services technology.

In contrast, aspects described herein potentialize the capability to properly search and retrieve services in a SOA development-time service repository. This can help avoid the uncontrolled proliferation of services inside the SOA development-time service repository. If the SOA development-time service repository includes duplicated services or substantially similar services without an appropriate way to define for end uses which service(s) are appropriate for the user's request, SOA objectives will not be achieved.

Proposed herein is a SOA ontology that may leverage existing ontologies, e.g. Ontology Web Language for Web Services (OWL-S) and Web Services Modeling Ontology (WSMO), with focus on service catalog implementation during development-time and considering varying types of service implementation technologies. The ontology may be used during development-time and work with services independent of implementation technology. These facilities described herein are referred to herein as OWL-SOA. In embodiments described herein, OWL-S and WSMO ontologies are leveraged to build OWL-SOA, though aspects described herein may leverage other ontologies.

During an ontology merge process described herein, there may be some concepts that are inherited from OWL-S and some from WSMO. Aspects described herein extend beyond those ontologies in various ways, for instance OWL-SOA describes evolution to development environment SOA repositories. Additionally, OWL-S and WSMO are dependent of services implemented using Web Services technology, while aspects described herein support inquiries against varying service implementation technologies, including REST-implemented services, as an example.

One example process to merge two ontologies uses the PROMPT ontology merge methodology, which at a high level includes including making initial suggestions and for each next operation, performing automatic updates, finding conflicts, and then making suggestions.

Typically, information about services in a development-time service repository includes requirements, nesting, functional requirements and other information. The first time the service is created, it is created in the development-time service repository. The development-time service repository can provide information directed to the components that are used to create the service, the kind of functional and non-functional requirements associated with the service, and other information. During the service development process, requirements management, test management, configuration management, and architecture management are dependencies for the service that appear in the development-time repository. After the service is built and determined to be suitable for runtime is it invoked in a real business process. This process is referred to as promoting the service from the development-time environment to the runtime environment.

The runtime service repository indicates relationships between a service and other services, business process(es) and other entities but only from an execution perspective, as opposed to a development/build perspective when the service was built. Existing SOA ontologies deal with runtime environment needs.

As described further below, the ontology integrates Reusable Asset Specification (RAS) artifacts by linking to them, e.g. using Open Service for Lifecycle Collaboration (OSLC). Example such artifacts include requirements artifacts (functional and non-functional), design artifacts indicating what kind of architecture was made, created or designed to create and build the service internally, implementation artifacts indicating what code/components were created to implement the specific service, and/or test artifacts mapping what tests were executed against the specific service. These assets can be key development environment elements that the ontology links to. The linking to RAS artifacts facilitates, at least in part, the support for a development-time repository to the OWL-SOA ontology.

As noted, an example ontology described herein supports different implementation technologies used to implement the services in the development-time repository. This is beneficial to large organizations, for instance, that typically already implement services using diverse implementation technologies. An ontology as described herein can provide an inference engine more powerful and precise than other approaches, for instance those based on metamodels and taxonomies. Through the use of ontology axioms, service searching, identification, and retrieval from a development-time service repository can be much more precise. Ontology axioms may be a set of restrictions or policies related to a specific concept. When a search is performed, the search algorithm can go through an inference engine and identify through those axioms which services are appropriate responses to the search. OWL is an example language for implementing those ontology axioms.

A concept referred to as service grounding indicates the implementation of the specific service (interface and other elements of the service). Example implementation technologies for services supported by an ontology described herein include Web Services, CORBA (Common Object Request Broker Architecture), FIX (financial information exchange), SBA (Space-Based Architecture), EJB (Enterprise Java Bean), JMS (Java Message Service), and REST (representational state transfer), as examples.

One potential application of facilities described herein involves support for an OWL-SOA ontology by an organizational library solution that helps an organization manage and govern the business and technical assets involved in software and systems delivery. One such library is the Rational® Asset Manager family of offerings from International Business Machines Corporation, Armonk, N.Y., U.S.A. (of which RATIONAL is a registered trademark). This can promote ontology usage in a SOA development-time repository, potentializing the capability of service search and retrieval, an additionally promote a more smooth and powerful integration to a runtime repository solution, such as the IBM WebSphere® Service Registry and Repository offered by International Business Machines Corporation (of which WEBSPHERE is a registered trademark). It can also promote a better technology alignment and integration with other Rational® offerings, such as IBM Rational® Software Architect Design Manager offered by International Business Machines Corporation.

FIG. 1 depicts an example computing environment to incorporate and use aspects described herein. Computing environment 100 includes a developer using a developer/SOA architect system 102 to access service repositories, such as SOA development-time service repository 105 and/or SOA runtime service repository 106, via one or more networks 112. The one or more networks 112 can include one or more wired and/or wireless private and/or public networks, including one or more local area networks and/or one or more wide area networks, such as an intranet or the internet. In FIG. 1, components thereof including developer/SOA architect system 102, the SOA service repositories 105, 106, and ALM/RAS server 108 are in communication with each other and network(s) 112 via communication links 110, which may be wired and/or wireless communication links across which data is sent and received.

A developer may handle a request to develop a new service or a new business process. As such, the developer might desire to query the SOA development-time service repository 105 to identify through a search whether a service already exists that would be useful to the development of the new service or business process. Typically, the developer has some requirements or other constraints that need to be followed. By way of simple example, the constraint may be that the service must support at least 1,000 simultaneous users. An ontology described herein can link to an Application Lifecycle Management (Reusable Asset Specification) server 108 via the network(s) 112 to obtain artifact information, such as requirements and testing information for services in the development-time repository. This may be useful when a service that satisfies that requirement can be identified in the development-time service repository because the developer might potentially reuse the service or components thereof. Prior approaches do not support this type of discovery based on the design and testing of the service (develop-time activities); the developer may have access to query the runtime repository but would not have a way to identify through development-time information whether the services thereof satisfy and were tested for the 1,000 simultaneous users requirement. Instead, a service's runtime behavior would be measured during execution of the service in order to determine its capabilities.

Thus, aspects described herein provide organizations with a more powerful development environment SOA repository that represents knowledge from the organization business and technology and also supports a better standardization in the way of searching and retrieving services across functional areas, promoting, and integrating explicit knowledge consumption.

Thus provided in embodiments described herein is an ontology that (i) provides organization and identification of services in a SOA development-time service repository; (ii) supports multiple service implementation technologies; (iii) may be composed by leveraging runtime ontologies such as OWL-S and WSMO; (iv) leverages the power of ontology concepts and axioms for search and retrieval operations against development-time repositories; and (v) integrates and aligns with RAS and OSLC standards.

The OWL-SOA ontology may be constructed based on three well-known standards: OWL-S, WSMO, and RAS. The construction of the OWL-SOA invokes some methodology for ontology merge. Example such methodologies include ONIONS, FCA-MERGE and PROMPT. In examples described herein, the PROMPT methodology may be used because it is not based on ontology libraries construction and does not use ontology instance localization into domain documents like some other ontology merge methodologies do.

Once some objectives for OWL-SOA are defined, for instance that it should support search and retrieval of services in a development-time repository and that it should support services independent of the implementation technology, a construction methodology such as Systematic Approach for Building Ontologies (SABiO) may be followed as a guideline to construct the ontology. In a particular example provided herein, this construction is broken into five steps described below to build/create the ontology.

1. Requirements Elicitation

An initial step is the ontology requirements elicitation. This process in general is driven by the definition of Competency Questions. Those questions may be used during the ontology instantiation process, and are questions that the OWL-SOA ontology is to answer.

Competency Questions drive the process of defining an ontology. An ontology merge process (above) can also use the competency questions as background to define which ontology elements should be included, excluded, or merged.

The following are six example competency questions that OWL-SOA is to answer: (i) How can a service be decomposed?; (ii) How can a service be categorized?; (iii) 3. Which are the characteristics from a service Public Interface?; (iv) In which technology is this service available?; (v) Which business concept(s) is this service related to?; and (vi) Which development assets are correlated to this service?

2. Merge of OWL-S and WSMO Using PROMPT Methodology

After the ontology objective definition and requirements elicitation phase, aspects of OWL-S and WSMO may be merged, for instance using the PROMPT methodology. Executing this merge process can include listing elements (e.g. Concepts, Attributes, Axioms, and Relationships) of those ontologies and merging at least some of those elements, driven by the above competency questions.

Figure 2:
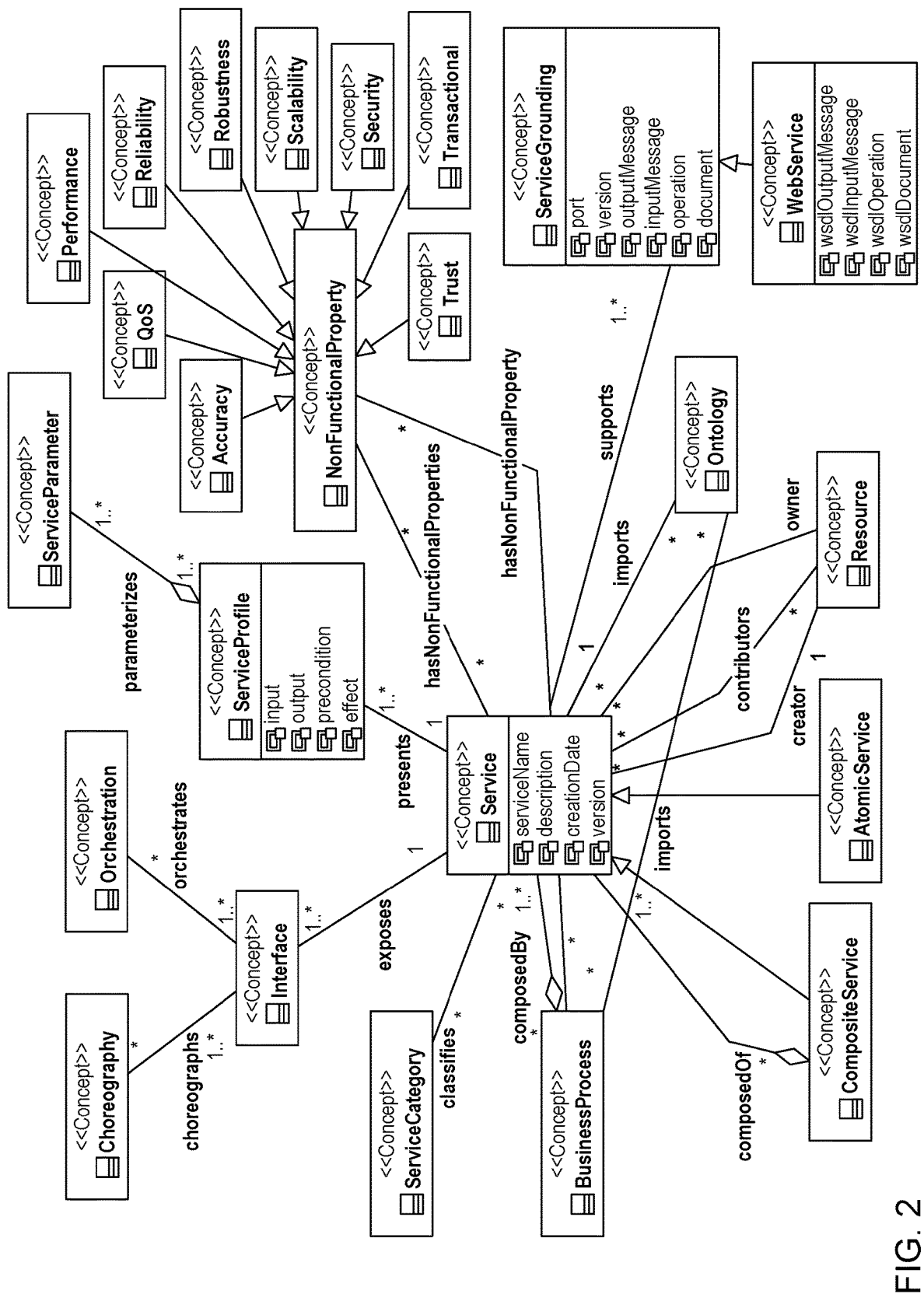
FIG. 2 depicts one example of a Unified Modeling Language representation of an ontology after execution of an ontology merge process, in accordance with aspects described herein.

FIG. 2 depicts one example of a Unified Modeling Language (UML) representation of an ontology after execution of an ontology merge process, in accordance with aspects described herein. In accordance with aspects described herein, this is extended, for instance as described herein to support application to development-time repositories and varying service implementation technologies.

OWL-SOA can incorporate ontology axioms that add inference to the ontology. An example axiom resultant from the merge process is presented as:

```
-Axiom Desription: (A1) All Business Process are Composed by at
least one Service
-OWL Expression:
  <owl:Class rdf:about="#BusinessProcess">
    <rdfs:subClassOf
      <owl:Restriction>
        <owl:onProperty>
          <owl:ObjectProperty
            rdf:ID="composedByService_directly"/>
        </owl:onProperty>
        <owl:someValuesFrom>
          <owl:Class rdf:about="#Service"/>
        </owl:someValuesFrom>
      </owl:Restriction>
    </rdfs:subClassOf>
  </owl:Class>
  <owl:ObjectProperty rdf:ID="composesProcess_directly">
    <rdfs:domain rdf:resource="#Service"/>
    <owl:inverseOf>
      <owl:ObjectProperty rdf:about="#composedByService_directly"/>
    </owl:inverseOf>
    <rdfs:subPropertyOf>
      <owl:ObjectProperty rdf:about="#composesProcess"/>
    </rdfs:subPropertyOf>
  </owl:ObjectProperty>
-Concepts: BusinessProcess, Service
-Relationships: *composedByService_directly*
```

At the end of this phase, a resultant merged ontology is provided, however support for varying service implementation technologies and development-time service repositories is not present.

3. Added Development Environment Elements Using RAS

The RAS is evaluated with the objective to select the elements of RAS that would enable OWL-SOA to address one or more of the competency questions, for instance the ones related to the development environment.

Figure 3:
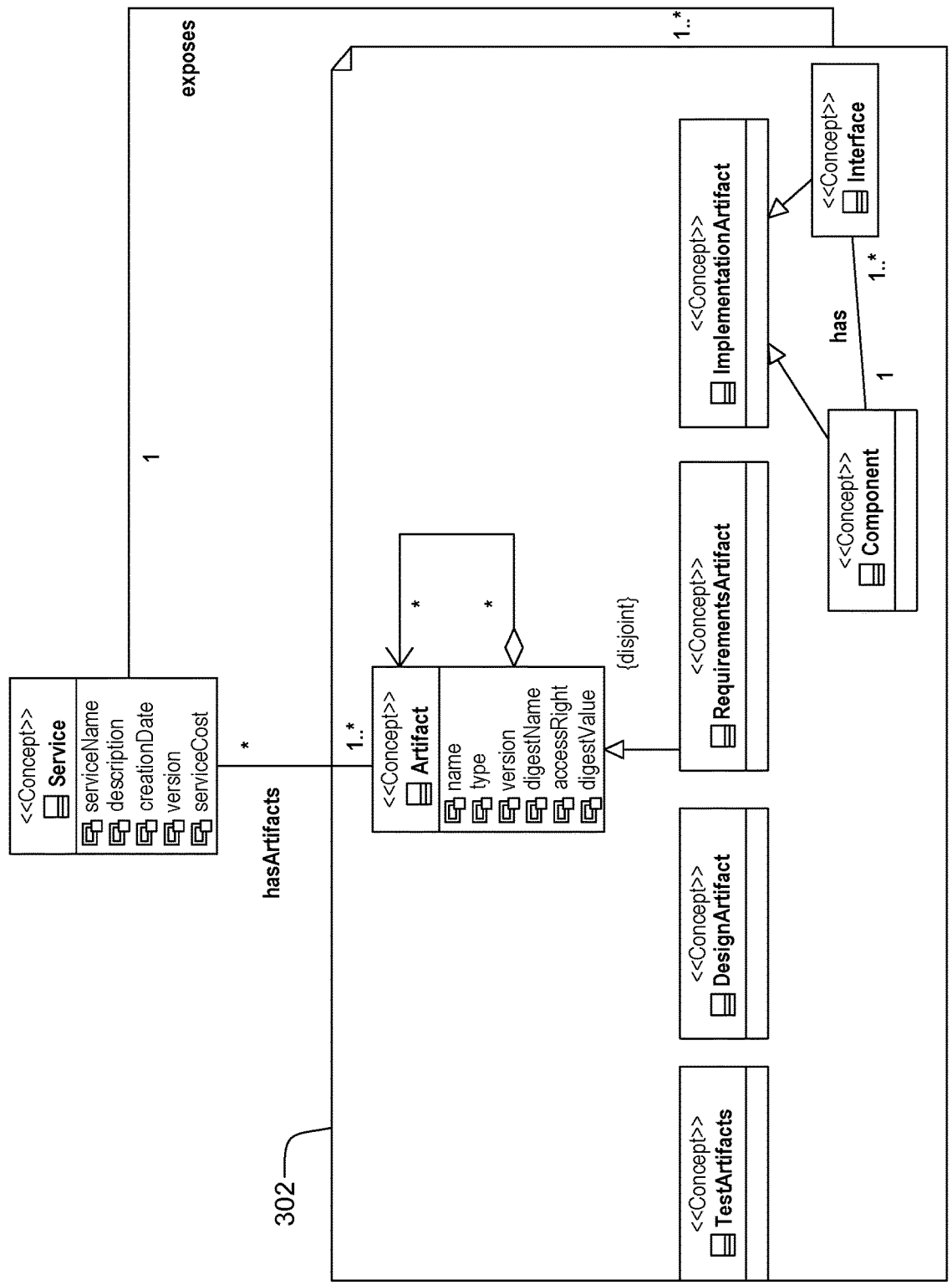
FIG. 3 illustrates a model showing development-time element inclusion in an ontology, in accordance with aspects described herein.

FIG. 3 illustrates development-time element inclusion in an ontology, in accordance with aspects described herein. Based on RAS 2.2 specification, FIG. 3 presents concepts, attributes, and relationships included in OWL-SOA. Elements in box 302 are the RAS elements that are linked-to, i.e. what is incorporated from the RAS specification into the ontology. In this example, several types of artifacts are linked-to, including Test artifacts, Design artifacts, Requirements artifacts and Implementation artifacts. It also links the service to the associated RAS elements of Component and Interface. By linking to these elements, a developer is able to search the development-time service repository and identify the requirements for the specific services (e.g. support for 1,000 simultaneous users). The developer can identify information indicating whether the service was tested, the results of the testing, the implemental artifacts for the specific service, and so on.

Organizations having Application Lifecycle Management (ALM) repositories may store relevant RAS artifacts. It is proposed herein in some embodiments to link to those elements instead of migrating that information from the ALM repository to the SOA repository, thought migrating/moving is an available option if desired. However, linking to that information may be preferred because the ALM/RAS element information may be updated occasionally and linking to the information ensures that the ontology is using the updated information. This eliminates the need to replicate that data to the SOA repository. Accordingly, in some examples of OWL-SOA, the development environment concepts may be placeholders to Open Services for Lifecycle Collaboration (OSLC) specification. The concepts exist on the ALM solutions and those concepts in the development-time repository point to those physical elements using OSLC and linked data technologies. Thus, relationships between the development environment elements can be based on OSLC specification standard link types and use of OSLC enables linking to the development-time elements in the ALM solution.

4. Added Multiple Implementation Technologies

Figure 4:
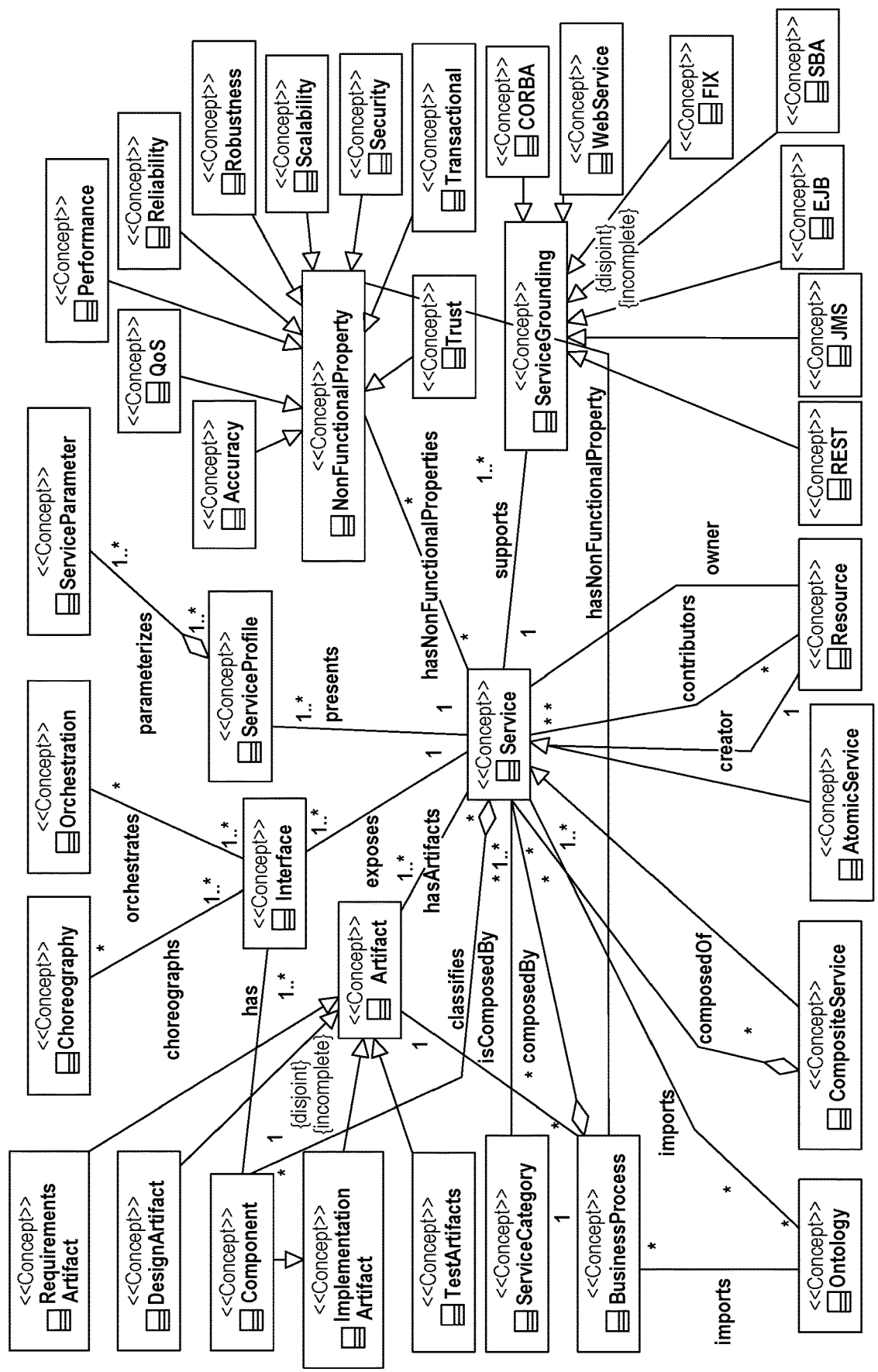
FIG. 4 illustrates a Unified Modeling Language representation of an ontology having ontological support for services of varying service implementation technologies and incorporating reusable asset specification artifacts, in accordance with aspects described herein.

To this point, the ontology supports development-time repository searching. However, independency of the implementation technology of the service is another aspect provided by an ontology described herein. FIG. 4 illustrates a Unified Modeling Language representation of an ontology having ontological support for services of varying service implementation technologies and incorporating reusable asset specification artifacts, in accordance with aspects described herein. The concept of service grounding is provided toward the bottom-right corner of the model depicted in FIG. 4. Elements inherited from service grounding include, in this example, Common Object Request Broker Architecture (CORBA), Web Service, financial information exchange (FIX), Space-Based Architecture (SBA), Enterprise Java Bean (EJB), Java Message Service (JMS), and representational state transfer (REST) concepts. Thus, not only would the ontology support web services implementation technology, but it also supports several other service implementation technologies as well.

Toward the top-left corner, there is a concept called Artifact shown as inheriting various RAS artifacts, such as requirements artifact, design artifact, component, implementation artifact, and test artifact. This enables application of the ontology to development-time service repositories.

The following presents another OWL-SOA axiom that may be created specifically to add inference for service technology implementation, i.e. associated with the service grounding aspects:

-Axiom Description: (A2) One service that is ServiceGrounding of one type cannot be of another type (for example FIX cannot be of any other type like Web Services, SBA, REST, EJB, JMS eCORBA).
-OWL Expression:
```
<owl:Class rdf:about="#FIX">
  <rdfs:subClassOf>
    <owl:Class rdf:about="#ServiceGrounding"/>
  </rdfs:subClassOf>
  <owl:disjointWith rdf:resource="#JMS"/>
  <owl:disjointWith>
    <owl:Class rdf:about="#CORBA"/>
  </owl:disjointWith>
  <owl:disjointWith rdf:resource="#SBA"/>
  <owl:disjointWith>
    <owl:Class rdf:about="#WebServices"/>
  </owl:disjointWith>
  <owl:disjointWith rdf:resource="#EJB"/>
  <owl:disjointWith>
    <owl:Class rdf:about="#REST"/>
  </owl:disjointWith>
</owl:Class>
```
-Concepts: Service, FIX, WebServices, SBA, REST, EJB, JMB, CORBA
-Relationships: ----

The example axiom above indicates that the service has only one service grounding type. This enables a developer to search for, e.g. JMS services, to repurpose.

5. Ontology Formalization

Once OWL-SOA ontology is conceptually defined, it is formalized using an ontology language, in this example Ontology Web Language (OWL) using an open source tool called Protégé, developed by Stanford University, California, U.S.A. In addition, an inference engine may be utilized in formalizing the ontology, an example such inference engine being Racer (Renamed ABox And Concept Expression Reasoner) offered through the University of Lubeck, Lubeck, Germany. The OWL-SOA axiom formalization example above defines that each service supports only (COBRA or EJB or FIX or WebService or SPB or REST or JMS).

The following present some example usage scenarios showing ways that an SOA architect might use an ontology in accordance with aspects described herein.

Scenario 1: The SOA architect searches for services inside a development-time service repository, the services being candidates that can be reused in a new business process to be implemented.

Scenario 2: If there is a non-functional requirement that one business process is to address, the SOA architect should find which services have been tested against and meet the same non-functional requirement that can be reused to compose the Business Process.

Scenario 3: Upon locating a particular service in the development-time service repository, the SOA Architect then learns how to invoke/reuse that service for a new business process. The architect learns the public interfaces of the given service.

Scenario 4: After a search query against the development-time service repository, assume the SOA architect found one service that can be reused on for the business process the architect works on. However, the service is to be extended so the SOA architect identifies what implementation technology has been used to implement the service and identifies which components and programs by which the service is composed.

Scenario 5: Given a service maintenance demand, the SOA developer can identify which business processes or services may be impacted by maintenance on a given service.

Scenario 6: Given a service maintenance activity, architects and testers can identify which test scenarios should be re-executed on the service after the maintenance is completed.

Figure 5A:
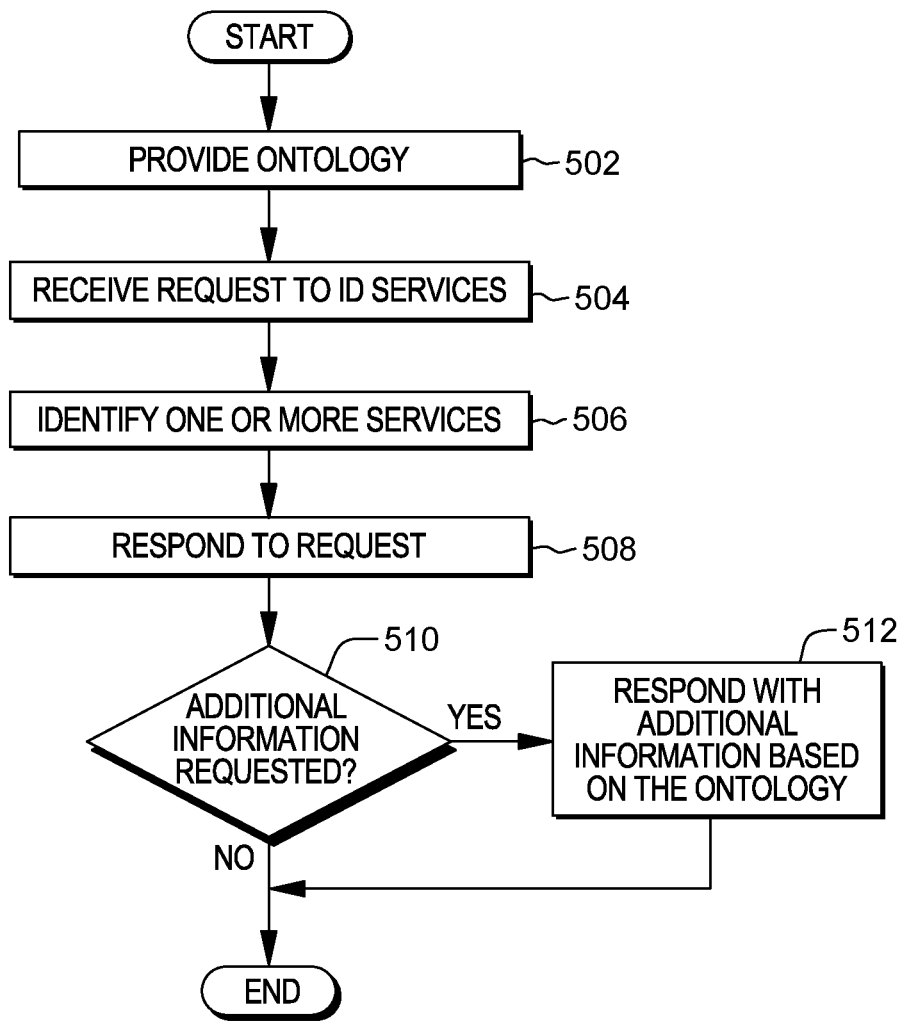
FIG. 5A depicts an example process for providing and using an ontology in accordance with aspects described herein.

Accordingly, FIG. 5A depicts an example process for providing and using an ontology in accordance with aspects described herein. In some examples, the process is performed singly or collectively by one or more computer systems, such as one or more servers that a service developer/architect queries to search for existing services in a development-time service repository of a service oriented architecture deployment in a computing environment. The process begins by providing an ontology for the service-oriented architecture deployment in the computing environment (502). The ontology provides organization and identification of a plurality of services in a development-time service repository of the service-oriented architecture. The plurality of services in the development-time service repository may be implemented using varying service implementation technologies, and the ontology can support inquiries about services implemented using the varying service implementation technologies.

Figure 5B:
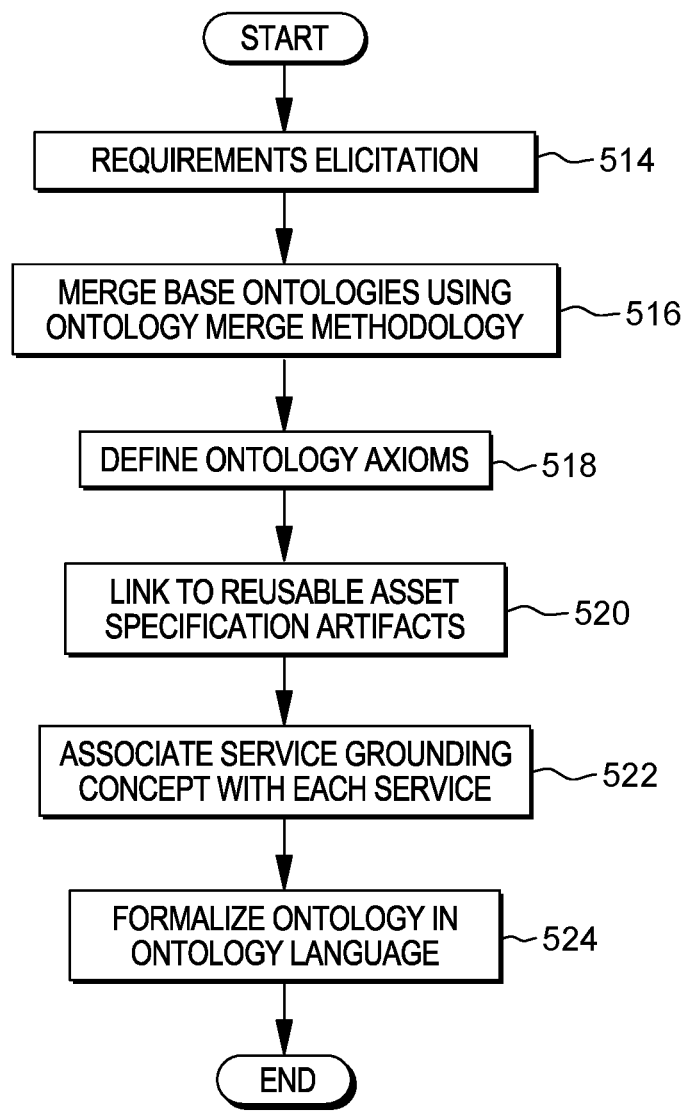
FIG. 5B depicts an example process for building an ontology in accordance with aspects described herein.

Providing the ontology can include building the ontology, an example process of which is depicted and described with reference to FIG. 5B. Referring to FIG. 5B, the building the ontology includes eliciting requirements (514), for instance driven by the definition of competency questions that the ontology is to answer. The process then merges based ontologies using an ontology merge methodology (516). In some examples, aspects of the OWL-S and WSMO ontologies are merged using the PROMPT ontology merge methodology.

The process continues by defining ontology axioms for the ontology (518), the ontology axioms building an inference engine. The inference engine can be used to identify at least one of potentially several services in the development-time service repository for responding to request(s), e.g. developer/service architect requests, to identify service results from the repository.

The building process also includes linking to Reusable Asset Specification (RAS) artifacts (520) associated with the plurality of services in the development-time service repository. Many different types of artifacts may be linked-to. For example, the RAS artifacts may be selected from the group consisting of requirements artifacts, design artifacts, implementation artifacts, and test artifacts. The RAS artifacts can include one or more requirements artifacts, one or more design artifacts, one or more implementation artifacts, or one or more test artifacts, or any combination of the foregoing.

The linking uses an appropriate linking specification, such as an Open Services for Lifecycle Collaboration (OSLC) specification.

Building the ontology can also include associating a respective service grounding concept with each service of the plurality of services in the development-time service repository (522). A service grounding concept associated with a service of the plurality of services can indicate a service implementation technology used to implement the service. The associating the respective service grounding concept with each service of the plurality of services can provide, at least in part, ontological support for inquiries about services implemented using the varying service implementation technologies. The varying service implementation technologies can include at least two service implementation technologies selected from the group consisting of web-services, representational state transfer (REST), Enterprise Java Bean (EJB), Space-Based Architecture (SBA), financial information exchange (FIX), Java Message Service (JMS), and Common Object Request Broker Architecture (CORBA).

The process of FIG. 5B continues by formalizing the ontology in an ontology language (524).

Referring back to FIG. 5A, after the ontology is provided, an entity such as a server can accept inquiries regarding identification of services in the development-time service repository. Thus, the process of FIG. 5A continues by receiving a request to identify service results from the development-time service repository (504). In some examples, the request is a search query from a service developer. Based on submission of such a request to identify service results from the development-time service repository, the process continues by identifying, using the ontology, one or more services of the plurality of services in the development-time service repository (506). The identifying can include identifying services of the plurality of services that have been tested against and satisfy one or more specified requirements, such as functional requirements, for reuse in one of more business processes to be developed. The specified requirements may be specified in the request. The one or more processes may be business processes to be developed by a user/developer submitting the request.

The process the continues by responding to the request with an indication of the identified one or more services (508).

Varying details of any discovered services discovered based on the received search request may be returned, at least initially, in response to the request. In some examples, if not already returned in responding to this initial request, more detailed or additional information may be returned based on request(s) for additional information about any of the services identified. For instance, in the process of FIG. 5A, a check is made about whether additional information has been requested (510), for instance requested by the developer in response to viewing the search results. If so, the process responds with additional information based on the given ontology (512). Then, or if no additional information was requested, the process ends.

As an example, the process can automatically or based on request for additional information (from 510), identify, using the ontology, one or more public interfaces of a service of the identified one or more services (i.e. identified in 506). The one or more pubic interfaces may be for reusing or invoking the service, and the process can, for instance as part of responding to the request (508) or responding with additional information (512), provide an indication of the one or more public interfaces to a service architect.

As another example, the process can automatically or based on request for additional information (from 510), identify, using the ontology, a service implementation technology of a service of the identified one or more services (i.e. identified in 506) and one or more components that compose the service, and the process can, for instance as part of responding to the request (508) or responding with additional information (512), provide an indication of the service implementation technology and the one or more components to a service architect.

Processes described herein may be performed singly or collectively by one or more computer systems, such as computer system(s) described below with reference to FIG. 6. In some embodiments, such a computer system may be or include the primary mobile device, secondary mobile device, and/or a remote cloud server in communication with these devices.

Figure 6:
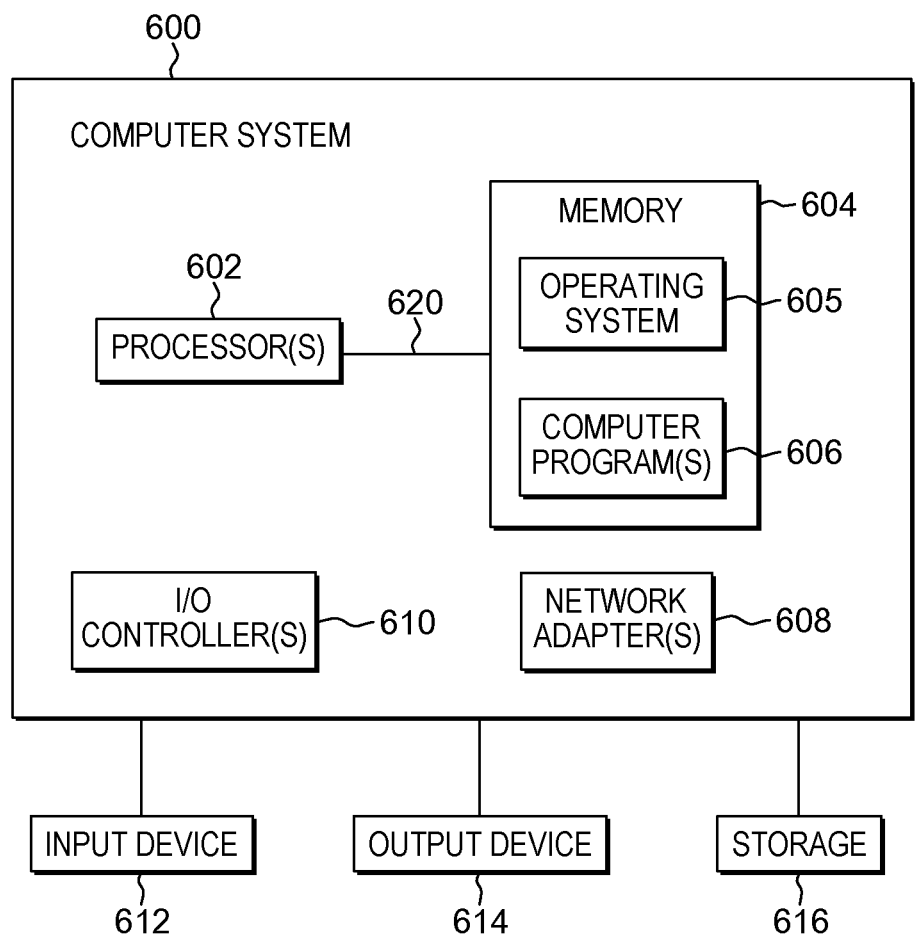
FIG. 6 depicts an example of a computer system to incorporate or use aspects described herein.

FIG. 6 depicts one example of a computer system to incorporate or use aspects described herein. A computer system may also be referred to herein as a data processing device/system or computing device/system, or simply a computer. Computer system 600 may be based on one or more of various system architectures such as those offered by International Business Machines Corporation (Armonk, N.Y., USA), or Intel Corporation (Santa Clara, Calif., USA), as examples.

Computer system 600 is suitable for storing and/or executing program code and includes at least one processor 602 coupled directly or indirectly to memory 604 through, e.g., a system bus 620. In operation, processor(s) 602 obtain from memory 604 one or more instructions for execution by the processors. Memory 604 may include local memory employed during actual execution of the program code, bulk storage, and cache memories which provide temporary storage of at least some program code in order to reduce the number of times code must be retrieved from bulk storage during program code execution. A non-limiting list of examples of memory 604 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 604 includes an operating system 605 and one or more computer programs 606, for instance programs to perform aspects described herein.

Input/Output (I/O) devices 612, 614 (including but not limited to displays, microphones, speakers, accelerometers, gyroscopes, magnetometers, light sensors, proximity sensors, GPS devices, cameras, etc.) may be coupled to the system either directly or through I/O controllers 610.

Network adapter(s) 608 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 608 used in computer systems.

Computer system 600 may be coupled to storage 616 (e.g., a non-volatile storage area, such as magnetic disk drives, optical disk drives, a tape drive, etc.), having one or more databases. Storage 616 may include an internal storage device or an attached or network accessible storage. Computer programs in storage 616 may be loaded into memory 604 and executed by a processor 602 in a manner known in the art.

The computer system 600 may include fewer components than illustrated, additional components not illustrated herein, or some combination of the components illustrated and additional components. Computer system 600 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 7:
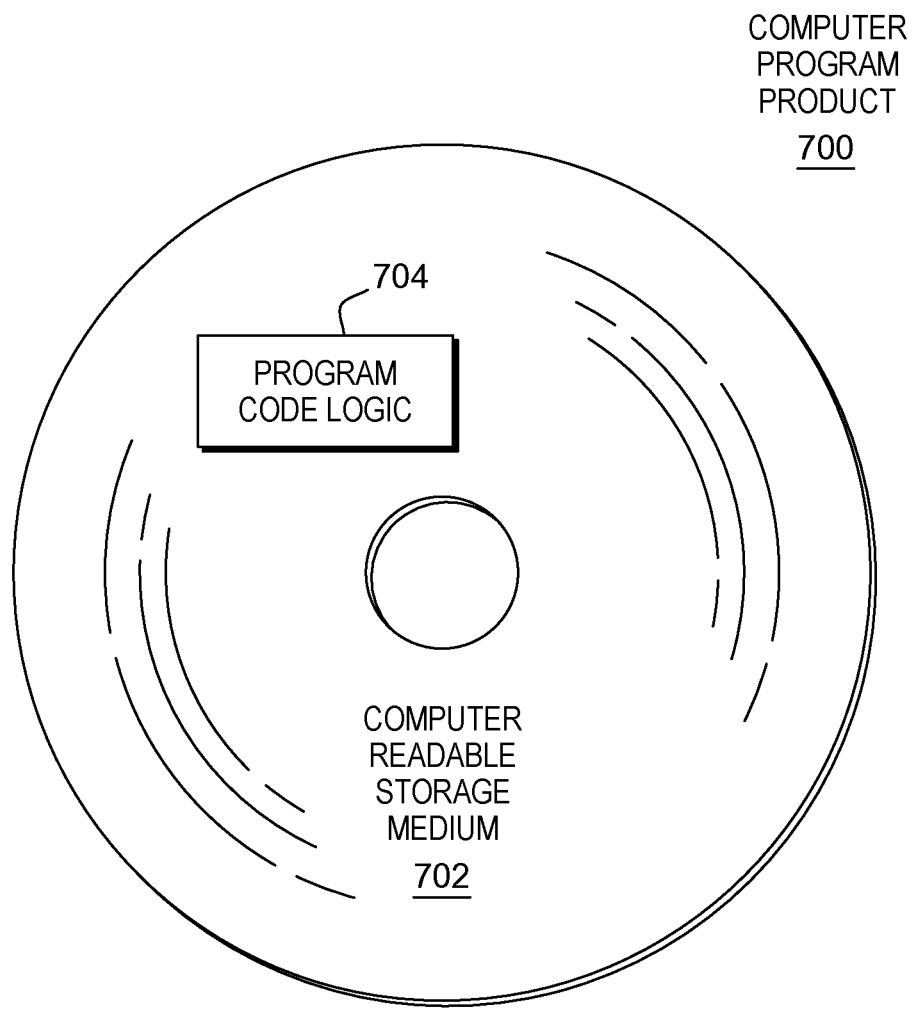
FIG. 7 depicts one embodiment of a computer program product.

Referring to FIG. 7, in one example, a computer program product 700 includes, for instance, one or more computer readable storage media 702 to store computer readable program code means, logic and/or instructions 704 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
providing, by the computer, an ontology for a service-oriented architecture deployment in a computing environment, the ontology providing organization and identification of a plurality of services in a development-time service repository of the service-oriented architecture, wherein the plurality of services in the development-time service repository are implemented using varying service implementation technologies and the ontology supports inquiries about services implemented using the varying service implementation technologies, the providing the ontology comprising:
building the ontology and formalizing the ontology in an ontology language, the building comprising:
merging elements of at least first and second ontologies for inclusion in the ontology;
building an inference engine from ontology axioms, the inference engine to identify services most appropriate to a corresponding request; and
integrating into the ontology Reusable Asset Specification (RAS) artifacts associated with the plurality of services in the development-time service repository, the integrating comprising the ontology linking to the RAS artifacts using an Open Services for Lifecycle Collaboration (OSLC) specification for obtaining artifact information for services in the development-time service repository, wherein the RAS artifacts comprise test artifacts indicating a result of testing a requirement of at least one of the plurality of services;
receiving, by the computer, a request to identify service results from the development-time service repository, the request specifying a constraint;
searching, by the computer, the development-time service repository, using the ontology, the linking, and the artifact information, to identify one or more services, of the plurality of services in the development-time service repository, as being relevant for potential reuse, wherein the development-time repository comprises a service-oriented architecture repository, and wherein the searching comprises:
using a link, of the linking, to the RAS artifacts to access and obtain artifact information including the test artifacts indicating the result of the testing, wherein the RAS artifacts are maintained in a second repository, different from the service-oriented architecture repository, and wherein the using the link accesses the second repository to obtain the artifact information including the test artifacts; and
assessing, using (i) the constraint of the search request, (ii) the at least one appropriate service identified from the inference engine, and (iii) the artifact information, including the test artifacts, accessed and obtained via using the link to the second repository, whether the at least one of the plurality of services, identified at least in part using the inference engine, satisfies the constraint of the search request and is to be identified as part of the identified one or more services relevant for potential reuse; and
responding, by the computer, to the request with a response indicating the identified one or more services relevant for potential reuse.

2. The method of claim 1, wherein the RAS artifacts further comprise at least one selected from the group consisting of requirements artifacts, design artifacts, and implementation artifacts.

3. The method of claim 1, wherein the building further comprises associating a respective service grounding concept with each service of the plurality of services in the development-time service repository, wherein a service grounding concept associated with a service of the plurality of services indicates a service implementation technology used to implement the service, and wherein the associating provides, at least in part, ontological support for inquiries about services implemented using the varying service implementation technologies.

4. The method of claim 1, wherein the varying service implementation technologies comprise at least two service implementation technologies selected from the group consisting of web-services, representational state transfer (REST), Enterprise Java Bean (EJB), Space-Based Architecture (SBA), financial information exchange (FIX), Java Message Service (JMS), and Common Object Request Broker Architecture (CORBA).

5. The method of claim 1, wherein the searching identifies services of the plurality of services that have been tested against and satisfy one or more specified functional requirements for reuse in one of more business processes to be developed.

6. The method of claim 1, further comprising identifying, using the ontology, one or more public interfaces of a service of the identified one or more services, the one or more pubic interfaces for reusing or invoking the service, and providing an indication of the one or more public interfaces to a service architect.

7. The method of claim 1, further comprising identifying, using the ontology, a service implementation technology of a service of the identified one or more services and one or more components that compose the service, and providing an indication of the service implementation technology and the one or more components to a service architect.

8. A computer program product comprising:
a computer readable storage medium readable by a processing circuit and storing instructions for execution by the processing circuit for performing a method comprising:
providing, by the computer, an ontology for a service-oriented architecture deployment in a computing environment, the ontology providing organization and identification of a plurality of services in a development-time service repository of the service-oriented architecture, wherein the plurality of services in the development-time service repository are implemented using varying service implementation technologies and the ontology supports inquiries about services implemented using the varying service implementation technologies, the providing the ontology comprising:
building the ontology and formalizing the ontology in an ontology language, the building comprising:
merging elements of at least first and second ontologies for inclusion in the ontology;
building an inference engine from ontology axioms, the inference engine to identify services most appropriate to a corresponding request; and
integrating into the ontology Reusable Asset Specification (RAS) artifacts associated with the plurality of services in the development-time service repository, the integrating comprising the ontology linking to the RAS artifacts using an Open Services for Lifecycle Collaboration (OSLC) specification for obtaining artifact information for services in the development-time service repository, wherein the RAS artifacts comprise test artifacts indicating a result of testing a requirement of at least one of the plurality of services;
receiving, by the computer, a request to identify service results from the development-time service repository, the request specifying a constraint;
searching, by the computer, the development-time service repository, using the ontology, the linking, and the artifact information, to identify one or more services, of the plurality of services in the development-time service repository, as being relevant for potential reuse, wherein the development-time repository comprises a service-oriented architecture repository, and wherein the searching comprises:
using a link, of the linking, to the RAS artifacts to access and obtain artifact information including the test artifacts indicating the result of the testing, wherein the RAS artifacts are maintained in a second repository, different from the service-oriented architecture repository, and wherein the using the link accesses the second repository to obtain the artifact information including the test artifacts; and
assessing, using (i) the constraint of the search request, (ii) the at least one appropriate service identified from the inference engine, and (iii) the artifact information, including the test artifacts, accessed and obtained via using the link to the second repository, whether the at least one of the plurality of services, identified at least in part using the inference engine, satisfies the constraint of the search request and is to be identified as part of the identified one or more services relevant for potential reuse; and
responding, by the computer, to the request with a response indicating the identified one or more services relevant for potential reuse.

9. The computer program product of claim 8, wherein the RAS artifacts further comprise at least one selected from the group consisting of requirements artifacts, design artifacts, and implementation artifacts.

10. The computer program product of claim 8, wherein the building further comprises associating a respective service grounding concept with each service of the plurality of services in the development-time service repository, wherein a service grounding concept associated with a service of the plurality of services indicates a service implementation technology used to implement the service, and wherein the associating provides, at least in part, ontological support for inquiries about services implemented using the varying service implementation technologies.

11. The computer program product of claim 10, wherein the varying service implementation technologies comprise at least two service implementation technologies selected from the group consisting of web-services, representational state transfer (REST), Enterprise Java Bean (EJB), Space-Based Architecture (SBA), financial information exchange (FIX), Java Message Service (JMS), and Common Object Request Broker Architecture (CORBA).

12. A computer system comprising:
a memory; and
a processor in communication with the memory, wherein the computer system is configured to perform a method, the method comprising:
providing, by the computer system, an ontology for a service-oriented architecture deployment in a computing environment, the ontology providing organization and identification of a plurality of services in a development-time service repository of the service-oriented architecture, wherein the plurality of services in the development-time service repository are implemented using varying service implementation technologies and the ontology supports inquiries about services implemented using the varying service implementation technologies, the providing the ontology comprising:
  building the ontology and formalizing the ontology in an ontology language, the building comprising:
    merging elements of at least first and second ontologies for inclusion in the ontology;
  building an inference engine from ontology axioms, the inference engine to identify services most appropriate to a corresponding request; and
  integrating into the ontology Reusable Asset Specification (RAS) artifacts associated with the plurality of services in the development-time service repository, the integrating comprising the ontology linking to the RAS artifacts using an Open Services for Lifecycle Collaboration (OSLC) specification for obtaining artifact information for services in the development-time service repository, wherein the RAS artifacts comprise test artifacts indicating a result of testing a requirement of at least one of the plurality of services;
receiving, by the computer system, a request to identify service results from the development-time service repository, the request specifying a constraint;
searching, by the computer system, the development-time service repository, using the ontology, the linking, and the artifact information, to identify one or more services, of the plurality of services in the development-time service repository, as being relevant for potential reuse, wherein the development-time repository comprises a service-oriented architecture repository, and wherein the searching comprises:
  using a link, of the linking, to the RAS artifacts to access an obtain artifact information including the test artifacts indicating the result of the testing wherein the RAS artifacts are maintained in a second repository, different from the service-oriented architecture repository and wherein the using the link accesses the second repository to obtain the artifact information including the test artifacts; and
  assessing, using (i) the constraint of the search request, (ii) the at least one appropriate service identified from the inference engine, and (iii) the artifact information, including the test artifacts, accessed and obtained via using the link to the second repository, whether the at least one of the plurality of services, identified at least in part using the inference engine, satisfies the constraint of the search request and is to be identified as part of the identified one or more services relevant for potential reuse; and
responding, by the computer system, to the request with a response indicating the identified one or more services relevant for potential reuse.

13. The computer system of claim 12, wherein the RAS artifacts further comprise at least one selected from the group consisting of requirements artifacts, design artifacts, and implementation artifacts.

14. The computer system of claim 12, wherein the building further comprises associating a respective service grounding concept with each service of the plurality of services in the development-time service repository, wherein a service grounding concept associated with a service of the plurality of services indicates a service implementation technology used to implement the service, and wherein the associating provides, at least in part, ontological support for inquiries about services implemented using the varying service implementation technologies.

15. The computer system of claim 12, wherein the varying service implementation technologies comprise at least two service implementation technologies selected from the group consisting of web-services, representational state transfer (REST), Enterprise Java Bean (EJB), Space-Based Architecture (SBA), financial information exchange (FIX), Java Message Service (JMS), and Common Object Request Broker Architecture (CORBA).

* * * * *